United States Patent
Yamakawa

(10) Patent No.: US 10,841,430 B2
(45) Date of Patent: Nov. 17, 2020

(54) INTERCOM SYSTEM AND DATA TRANSFER METHOD IN SAID SYSTEM

(71) Applicant: AIPHONE CO., LTD., Nagoya (JP)

(72) Inventor: Seiya Yamakawa, Nagoya (JP)

(73) Assignee: AIPHONE CO., LTD, Nagoya-Aichi (JP)

( * ) Notice: Subject to any disclaimer, the term of this patent is extended or adjusted under 35 U.S.C. 154(b) by 100 days.

(21) Appl. No.: 16/089,303

(22) PCT Filed: Mar. 23, 2017

(86) PCT No.: PCT/JP2017/011798
§ 371 (c)(1),
(2) Date: Sep. 27, 2018

(87) PCT Pub. No.: WO2017/170151
PCT Pub. Date: Oct. 5, 2017

(65) Prior Publication Data
US 2019/0281161 A1    Sep. 12, 2019

(30) Foreign Application Priority Data

Mar. 28, 2016   (JP) .................. 2016-063066

(51) Int. Cl.
*H04M 9/02* (2006.01)
*G06F 8/65* (2018.01)
(Continued)

(52) U.S. Cl.
CPC ................ *H04M 9/02* (2013.01); *G06F 8/65* (2013.01); *H04M 9/002* (2013.01); *H04W 4/80* (2018.02)

(58) Field of Classification Search
CPC ........... H04M 9/02; H04M 9/002; G06F 8/65; H04W 4/80
See application file for complete search history.

(56) References Cited

U.S. PATENT DOCUMENTS

2006/0248162 A1   11/2006  Kawasaki
2007/0047712 A1*   3/2007  Gross .................. H04M 11/025
                                                              379/167.01
(Continued)

FOREIGN PATENT DOCUMENTS

CN          104869478 A     8/2015
FR            3017970 A3    8/2015
(Continued)

OTHER PUBLICATIONS

International Search Report and Written Opinion for related International Application No. PCT/JP2017/011798, dated Jun. 13, 2017; English Translation for the ISR provided; 10 pages.
(Continued)

*Primary Examiner* — Phung-Hoang J Nguyen
(74) *Attorney, Agent, or Firm* — Procopio, Cory, Hargreaves & Savitch LLP

(57) ABSTRACT

An intercom system for use in a housing complex constituted by dwelling buildings is provided in which each of the dwelling buildings is provided with a dwelling parent device installed in each dwelling, a collective foyer device with which a calling operation may be performed for calling the dwelling parent devices, and a building control unit configured to communicatively interconnect the dwelling parent device in each dwelling of the host building and the collective foyer device via an intercom line, the collective foyer device includes a storage unit in which terminal information of the collective foyer device is stored, the collective foyer device or the building control unit is capable of performing communication with an external device connected to an external network, and data on the external network is transferred to the collective foyer device or the building control unit by using the external device as a communication medium.

10 Claims, 3 Drawing Sheets

(51) Int. Cl.
  *H04M 9/00* (2006.01)
  *H04W 4/80* (2018.01)

(56) References Cited

U.S. PATENT DOCUMENTS

| | | | | |
|---|---|---|---|---|
| 2011/0007883 | A1* | 1/2011 | Bingham | H04M 11/025 379/93.17 |
| 2014/0164258 | A1* | 6/2014 | Suzuki | G06Q 10/20 705/305 |
| 2014/0219431 | A1* | 8/2014 | Wagner | H04M 11/025 379/167.02 |
| 2015/0097669 | A1* | 4/2015 | Li | G08B 5/222 340/539.13 |
| 2018/0062792 | A1* | 3/2018 | Sugaya | H04L 1/1867 |

FOREIGN PATENT DOCUMENTS

| | | |
|---|---|---|
| JP | 2002-125059 A | 4/2002 |
| JP | 2004-260679 A | 9/2004 |
| JP | 2005184593 A | 7/2005 |
| JP | 2006-253954 A | 9/2006 |
| JP | 2006309516 A | 11/2006 |
| JP | 2010178212 A | 8/2010 |
| JP | 2013232764 A | 11/2013 |
| JP | 2014-045307 A | 3/2014 |
| JP | 2014116841 A | 6/2014 |
| JP | 2014-207535 A | 10/2014 |
| JP | 2015-090694 A | 5/2015 |

OTHER PUBLICATIONS

Notification of Reasons for Refusal for related JP App No. 2016-063066, dated Oct. 23 2019, 9 pgs.
General Catalog 2013 for Apartment HA System, Panasonic Corporation, Eco Solutions Company, Marketing Division, Urban Environment Product Sales Planning Department, Jun. 2013, 7 pgs.
Information Offer for related JP App No. 2016-063066, dated Jul. 2, 2019, 58 pgs.
Extended European Search Report for related European Application No. 17774689.8, dated Jun. 26, 2019; 8 pages.

* cited by examiner

INTERCOM SYSTEM AND DATA TRANSFER METHOD IN SAID SYSTEM

CROSS-REFERENCE TO RELATED APPLICATIONS

This application is a U.S. National Stage entry of PCT Application No: PCT/JP2017/011798 filed on Mar. 23, 2017, which claims priority to Japanese Patent Application No. 2016-063066, filed Mar. 28, 2016, the contents of which are incorporated herein by reference.

TECHNICAL FIELD

The present invention relates to an intercom system that is to be used in a housing complex, and a data transfer method in said system.

RELATED ART

In the related art, an intercom system for a housing complex constituted by a plurality of dwelling buildings has been known. In the intercom system, each of the dwelling buildings is connected to a controller by way of an intercom line (an intercom dedicated line).

CITATION LIST

Patent Documents

Patent Document 1: JP-A-2004-260679

SUMMARY OF THE INVENTION

Problems to be Solved by the Invention

When introducing the intercom system for the housing complex constituted by the plurality of dwelling buildings, a centralized controller configured to control the plurality of buildings in a centralized manner is installed in a centralized control building for centralized management. Also, in order to record resident information and setting information (for example, an unlocking code of a collective foyer device) in a management office parent device installed in a management office of each of the dwelling buildings and a collective foyer device, data transfer is designated from a memory of an external device such as a computer by using the external device. Since the resident information and the like are recorded in the external device, there is a problem such as security ensuring for preventing data leak.

It is therefore an object of the present invention to provide an intercom system capable of ensuring security upon data transfer to each device, and data transfer method in the system.

Means for Solving the Problems

In order to achieve the above object, an intercom system of the present invention is an intercom system that is to be used in a housing complex constituted by a plurality of dwelling buildings,
wherein each of the plurality of dwelling buildings includes:
a dwelling parent device installed in each dwelling,
a terminal device with which it is possible to perform a calling operation for calling the dwelling parent device, and
a building control unit configured to communicatively interconnect the dwelling parent device in each dwelling of a host building and the terminal device by way of an intercom line,
wherein the terminal device includes a storage unit in which terminal information of the terminal device is stored,
wherein the terminal device or the building control unit is capable of performing communication with an external device connected to an external network, and
wherein data on the external network is transferred to the terminal device or the building control unit by using the external device as a communication medium.

According to the above configuration, when transferring data from the external network to the terminal device or the building control unit, since the resident information, the setting information and the like are not stored in the external device, it is possible to prevent data leak from the external device, thereby ensuring the security.

Also, in the intercom system of the present invention, when a predetermined application is activated in the external device,
a communication establishment unit configured to establish communication between the terminal device or the building control unit and the external network,
an update information presence/absence determination unit configured to determine whether there is update information of the data on the external network, and
an information transmission unit that transmits the update information from the external network to the terminal device or the building control unit when it is determined that there is the update information may be generated.

According to the above configuration, it is possible to transmit the update information on the external network to the terminal device or the building control unit in the intercom system by the simple configuration of activating the application stored in the external device.

Also, in the intercom system of the present invention, the external device may be configured to transfer the data to the terminal device or the building control unit by a near field wireless communication means.

According to the above configuration, it is possible to transmit data on a setting server to the intercom system by a simple operation of bringing the external device close to the terminal device or the building control unit.

Also, in the intercom system of the present invention, the building control units of the plurality of dwelling buildings may be interconnected via a network on which communication is to be performed in accordance with a general-purpose protocol.

According to the above configuration, it is possible to transmit the data, which has been transmitted to the building control unit of one dwelling building, to the building control units of the other dwelling buildings via the communication network configured to interconnect the dwelling buildings.

In order to achieve the above object, a data transfer method in an intercom system of the present invention is a data transfer method in an intercom system that is to be used in a housing complex constituted by a plurality of dwelling buildings each of which includes a dwelling parent device installed in each dwelling, a terminal device capable of calling the dwelling parent device, and a building control unit configured to communicatively interconnect the dwelling parent device and the terminal device. The data transfer method includes:
a step of activating a predetermined application stored in an external device capable of performing communication with the terminal device or the building control unit, a step of establishing communication between the external device and an external network by the application, a step of determining whether there is update information of predetermined data on the external network, a step of, when it is determined that there is the update information, establishing communication between the terminal device or the building control unit and the external network via the external device by a near field wireless communication means, and a step of transmitting the update information from the external network to the terminal device or the building control unit by using the external device as a communication medium.

In order to achieve the above object, a data transfer method in an intercom system of the present invention is a data transfer method in an intercom system that is to be used in a housing complex constituted by a plurality of dwelling buildings each of which includes a dwelling parent device installed in each dwelling, a terminal device capable of calling the dwelling parent device, and a building control unit configured to communicatively interconnect the dwelling parent device and the terminal device. The data transfer method includes:

a step of activating a predetermined application stored in an external device capable of performing communication with the terminal device or the building control unit, a step of establishing communication between the terminal device or the building control unit and the external device by the application, a step of establishing communication between the terminal device or the building control unit and an external network via the external device, a step of determining whether there is update information of predetermined data on the external network, and a step of, when it is determined that there is the update information, transmitting the update information from the external network to the terminal device or the building control unit by using the external device as a communication medium by means of a near field wireless communication means.

According to the above configuration, when transferring data from the external network to the terminal device or the building control unit, since the resident information, the setting information and the like are not stored in the external device, it is possible to prevent data leak from the external device, thereby ensuring the security.

Effects of the Invention

According to the intercom system and the data transfer method in the system of the present invention, it is possible to ensure the security upon the data transfer to each device.

DETAILED DESCRIPTION OF ILLUSTRATIVE EMBODIMENT

Hereinafter, an example of an illustrative embodiment will be described with reference to the accompanying drawings.

Figure 1:
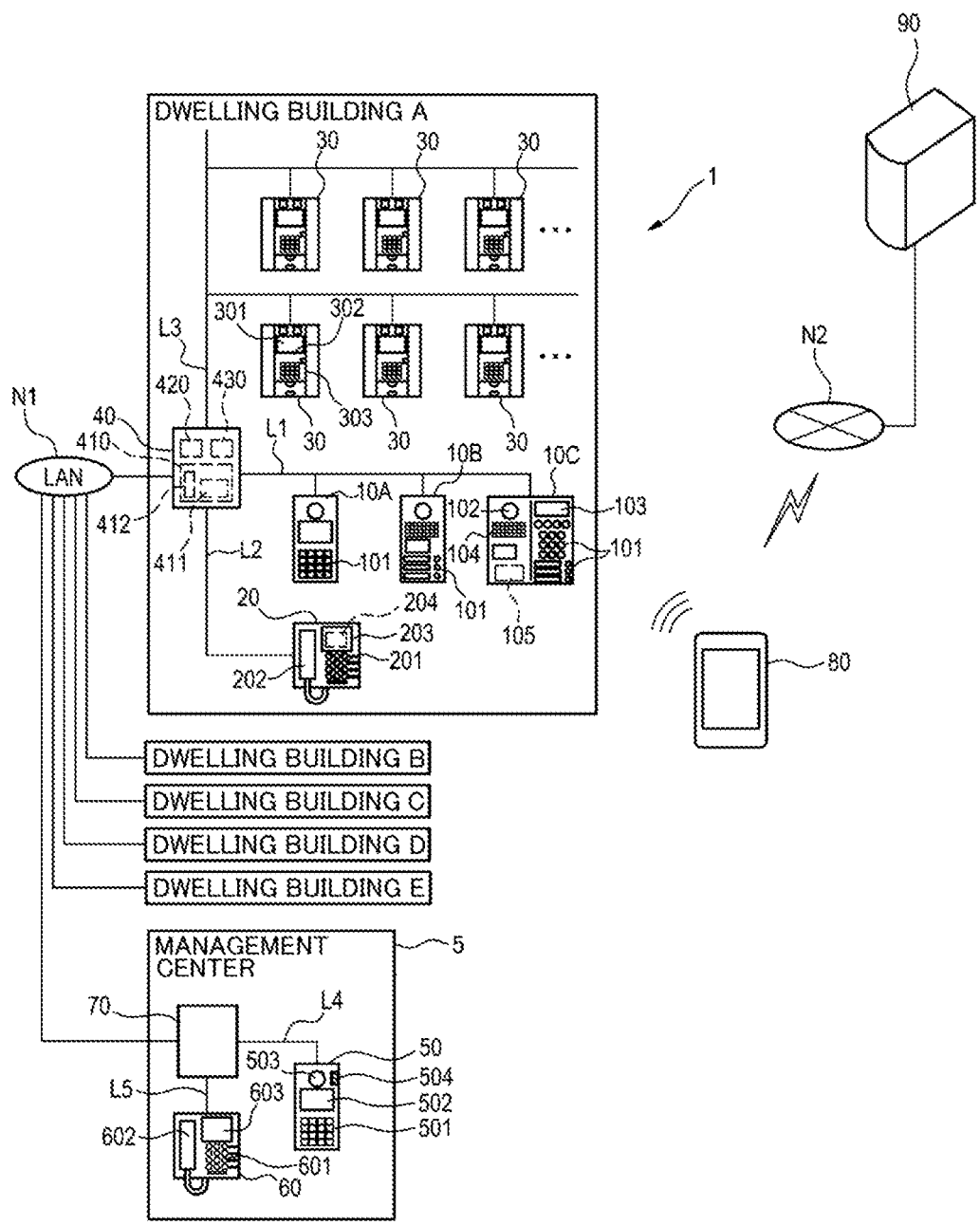
FIG. 1 is a configuration view of an intercom system in accordance with an illustrative embodiment of the present invention.

As shown in FIG. 1, an intercom system 1 is a system that is used in a housing complex such as a condominium building constituted by a plurality of dwelling buildings (in the example, a dwelling building A to a dwelling building E). The intercom system 1 includes collective foyer devices 10A to 10C (an example of the terminal device), a management office parent device 20 (an example of the terminal device), dwelling parent devices 30, and a building control unit 40 in each of the dwelling building A to the dwelling building E. In FIG. 1 of the example, the respective configurations are shown only for the dwelling building A. The dwelling buildings are respectively interconnected via a network N1 (in the example, LAN: Local Area Network) configured to perform communication in accordance with a general-purpose protocol. Also, the intercom system 1 includes a management center 5, which is connected to each dwelling building via the network N1.

The collective foyer devices 10A to 10C (hereinafter, referred to as the collective foyer device 10 when collectively describing the same) are installed in collective foyers, shared spaces and the like of the housing complex. The collective foyer device 10 includes a calling unit 101, a camera 102, a display unit 103, a phone call unit 104, a storage unit 105, and the like.

In the storage unit 105 of the collective foyer device 10, resident information, terminal information such as setting information, and the like are stored. Specifically, for example, a calling table in which a room number of each dwelling in a host building, a name of a resident and a name of the dwelling (for example, a tenant name), a dwelling parent device ID (ID: identification) for specifying the dwelling parent device 30 and a dedicated button for calling are associated, an entrance unlocking code (an encryption key of a contactless key), and the like are included.

The collective foyer device 10 is configured to call the dwelling parent device 30 in the host building or the management office parent device 20 in the host building by operating the calling unit 101, for example. Also, the collective foyer device 10 is configured to make a phone call to a resident at the dwelling parent device 30 or a manager at the management office parent device 20 by way of the phone call unit 104, for example. The collective foyer device 10 is configured to control calling processing, phone call processing and the like, based on the calling table. As the collective foyer device, a ten key operating type such as the collective foyer device 10A, a dedicated button pushing type such as the collective foyer device 10B, a combined type of the ten key and the dedicated button such as the collective foyer device 10C, and the like may be used.

The collective foyer device 10 is communicatively connected to the building control unit 40 via an intercom line (intercom dedicated line) L1. Also, the collective foyer device 10 can be communicatively connected to an external device 80 (for example, a smart phone, a PC (Personal Computer), and the like) via wireless communication, for example, a near field wireless communication means (NFC (Near Field Communication) (registered trademark)). The collective foyer device 10 is mounted therein with a chip (for example, an NFC chip) for wireless communication.

The management office parent device 20 is installed in a management office of the housing complex. The management office parent device 20 includes an operation unit 201, a phone call unit 202, a display unit 203, a storage unit 204, and the like.

In the storage unit 204, the terminal information such as the calling table is stored, like the storage unit 105 of the collective foyer device 10.

The management office parent device 20 is configured to call the dwelling parent device 30 in the host building by operating the operation unit 201, for example. Also, the management office parent device 20 is configured to make a phone call to a visitor at the collective foyer device 10 or a resident at the dwelling parent device 30 by way of the phone call unit 202. The management office parent device 20 is configured to control the calling processing, the phone call processing and the like, based on the calling table.

The management office parent device 20 is communicatively connected to the building control unit 40 via an intercom line L2. Also, the management office parent device 20 can be communicatively connected to the external device 80 via the NFC, like the collective foyer device 10. The management office parent device 20 is mounted therein with a chip for wireless communication, like the collective foyer device 10.

The dwelling parent device 30 is installed in each dwelling unit of the housing complex. The dwelling parent device 30 includes a display unit 301, an operation unit 302, a phone call unit 303, and the like. The dwelling parent device 30 is configured to respond to a calling from the collective foyer device 10 or the management office parent device 20, through the phone call unit 303, for example. Also, the dwelling parent device 30 is configured to call the management office parent device 20 by operating the operation unit 302. In each dwelling parent device 30, a dwelling parent device ID for specifying the dwelling parent device is stored. The dwelling parent device 30 is communicatively connected to the building control unit 40 via an intercom line L3.

The building control unit 40 is installed in each of the dwelling buildings. The building control unit 40 includes a building controller 410, a video controller 420, and an audio controller 430. Also, the building controller 410 includes a storage unit 411, and a signal conversion unit 412.

In the storage unit 411, the terminal information such as the calling table is stored, like the storage unit 105 of the collective foyer device 10.

The signal conversion unit 412 includes an analog to digital converter configured to convert an analog signal, which can be communicated via the intercom lines L1 to L3, into a digital signal, which can be communicated via the network N1, and a digital to analog converter configured to convert the digital signal to the analog signal.

The building controller 410 is configured to perform the control such as communication processing among the collective foyer device 10, the management office parent device 20 and the dwelling parent device 30, which are connected via the intercom lines, based on the calling table, for example. Also, the building controller 410 performs the control such as the calling processing and the phone call processing on the basis of the calling table when a signal for calling the dwelling parent device 30 in the host building is transmitted from the management center 5, for example.

The video controller 420 is configured to execute signal processing for video signals captured with the collective foyer device 10 and the management center 5, and to transmit the processed video signal toward the dwelling parent device 30 or the management office parent device 20 in the host building. The audio controller 430 is configured to execute signal processing for audio signals transmitted from the collective foyer device 10, the management office parent device 20, the dwelling parent device 30, the management center 5 and the like, and to transmit the processed audio signals toward each transmission destination.

The building control unit 40 is communicatively connected to the building control units 40 of the other dwelling buildings (in the example, the dwelling building B to the dwelling building E) and a centralized control unit 70 (which will be described later) of the management center 5 via the network N1. Also, the building control unit 40 can be communicatively connected to the external device 80 via the NFC, like the collective foyer device 10. The building control unit 40 is mounted therein with a chip for wireless communication, like the collective foyer device 10.

The management center 5 is configured to manage the whole housing complex from the dwelling building A to the dwelling building E, and includes a centralized collective foyer device 50, a centralized management office parent device 60, and a centralized control unit 70.

The centralized collective foyer device 50 is installed in a foyer of the management center 5. The centralized collective foyer device 50 includes a calling unit 501, a display unit 502, a camera 503, a phone call unit 504 and the like. The centralized collective foyer device 50 is configured to call the dwelling parent device 30 of each of the dwelling buildings and the centralized management office parent device 60 of the management center 5, for example. The centralized collective foyer device 50 is communicatively connected to the centralized control unit 70 via an intercom line L4.

The centralized management office parent device 60 is installed in a management office of the management center 5. The centralized management office parent device 60 includes an operation unit 601, a phone call unit 602, a display unit 603 and the like. The centralized management office parent device 60 is configured to call the dwelling parent device 30 of each of the dwelling buildings, for example. Also, the centralized management office parent device 60 is configured to make a phone call to a visitor at the centralized collective foyer device 50 or a resident at the dwelling parent device 30. The centralized management office parent device 60 is communicatively connected to the centralized control unit 70 via an intercom line L5.

The centralized control unit 70 is configured to control communication that is to be performed between the centralized collective foyer device 50 and the centralized management office parent device 60 connected via the intercom lines, for example. Also, the centralized control unit 70 is communicatively connected to each building control unit 40 of the dwelling building A to the dwelling building E via the network N1. In the meantime, the centralized control unit 70 includes a signal converter configured to convert an analog signal, which can be communicated via the intercom lines L4, L5, into a digital signal, which can be communicated via the network N1, like the building control unit 40.

Figure 2:
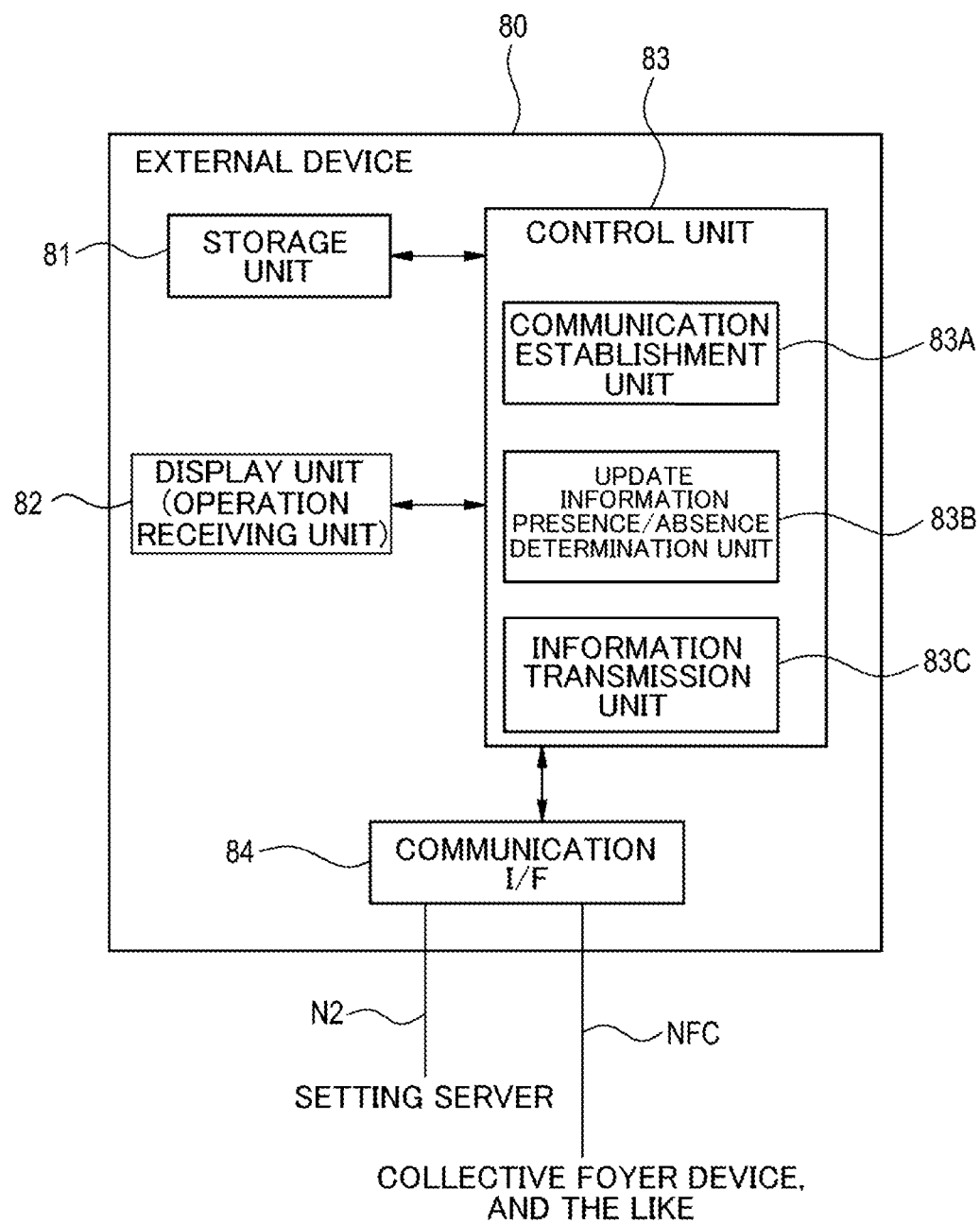
FIG. 2 is a functional block diagram of an external device in accordance with the illustrative embodiment of the present invention.

The external device 80 can be connected to a setting server 90 via an external network N2 (the Internet, in the example). As shown in FIG. 2, the external device 80 includes a storage unit 81, a display unit 82, a control unit 83, and a communication interface (hereinafter, referred to as 'communication I/F') 84.

In the storage unit 81, an application capable of calling predetermined data from the accessed setting server 90 and transmitting the called data to the other target devices (for example, the collective foyer device 10, the management office parent device 20, the dwelling parent device 30, the building control unit 40 and the like) through the wireless communication is installed. The display unit 82 can display the application installed in the storage unit 81, and can receive a user operation for activating the application. The communication I/F 84 is configured to form a signal transmission path through the Internet N2 between the external device 80 and the setting server 90, and to form a signal transmission path through the NFC between the external device 80 and the collective foyer device 10, management office parent device 20 and building control unit 40 to which the external device 80 is brought close.

In the control unit 83, the application installed in the storage unit 81 is activated, so that a communication establishment unit 83A, an update information presence/absence determination unit 83B and an information transmission unit 83C are generated. The control unit 83 is configured to generate the communication establishment unit 83A and to establish communication in the communication establishment unit 83A between the collective foyer device 10, management office parent device 20 and building control unit 40 and the setting server 90, based on a command from the application activated by a user operation on the display unit 82, which is an operation receiving unit. Also, the control unit 83 is configured to generate the update information presence/absence determination unit 83B and to determine in the update information presence/absence determination unit 83B whether the setting server 90 communicatively connected by the communication establishment unit 83A has the terminal information (for example, update information relating to the terminal information) to be transmitted to the collective foyer device 10, the management office parent device 20 and the building control unit 40, based on a command from the application. Also, the control unit 83 is configured to generate the information transmission unit 83C, based on a command from the application, and receives the update information from the setting server 90 via the Internet N2 and transmits the update information to the collective foyer device 10, the management office parent device 20, and the building control unit 40 via the NFC by way of the information transmission unit 83C when it is determined in the update information presence/absence determination unit 83B that the setting server 90 has the update information. The information transmission unit 83C has functions of automatically switching a communication line from a communication line of LTE (Long Term Evolution), which is used between the external device 80 and the setting server 90, for example, to a communication line of the NFC that is used between the external device 80 and the collective foyer device 10, management office parent device 20 and building control unit 40, and transferring the data, for example.

Like this, according to the illustrative embodiment, the data called from the setting server 90 is not stored in the external device 80 but is transferred to the target device through the external device 80. That is, the external device 80 is used as a communication medium for relaying the data transfer.

The external device 80 is mounted therein with a chip for wireless communication, like the collective foyer device 10.

In the setting server 90, master data of the terminal information (the calling table, the unlocking code and the like) stored in the storage units of the collective foyer device 10, the management office parent device 20 and the building control unit 40 is stored. The terminal information of the setting server 90 is managed by a construction operator of the intercom system 1, for example, and the setting thereof is changed every update.

Figure 3:
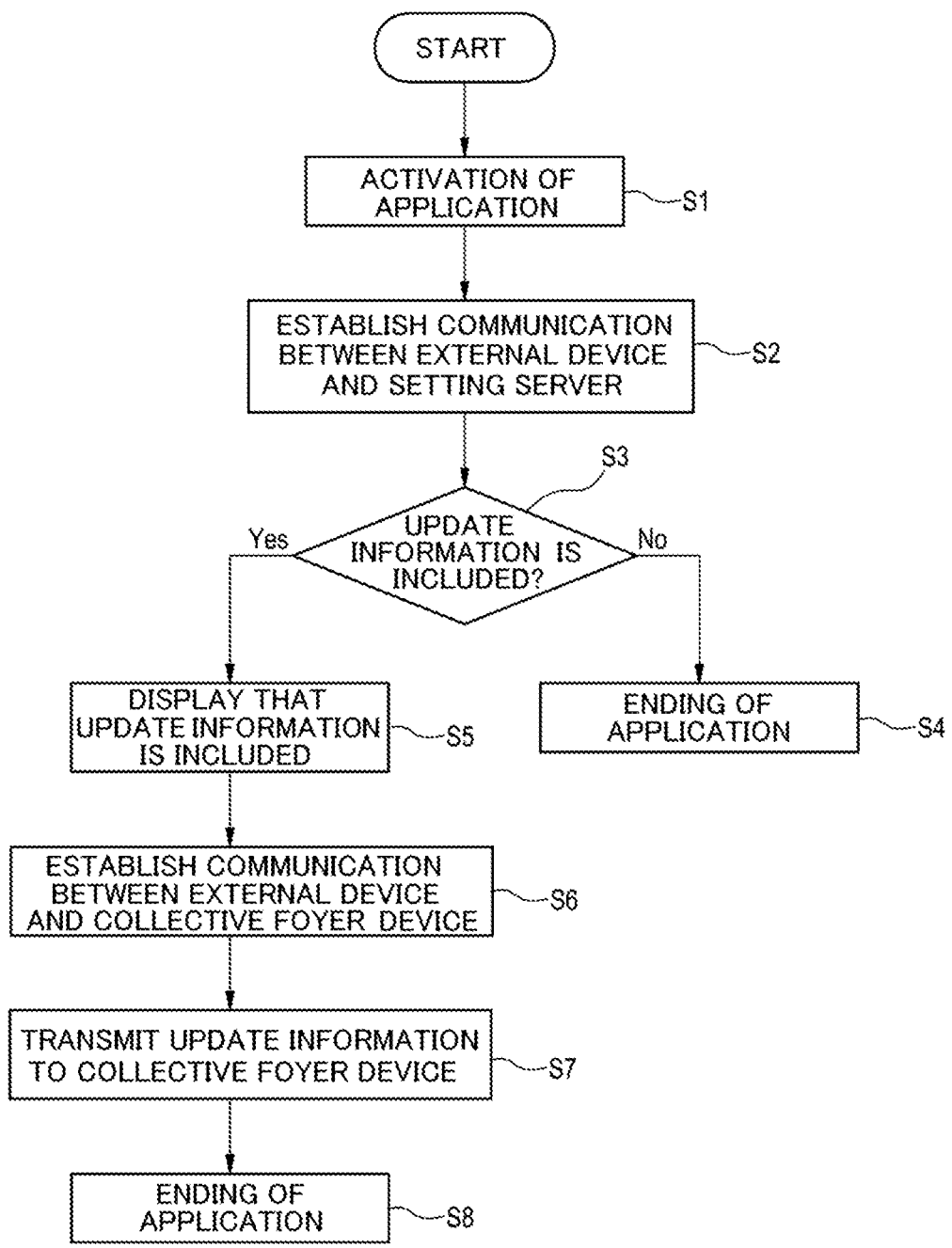
FIG. 3 is a flowchart for illustrating an operation (a data transfer method) of the intercom system in accordance with the illustrative embodiment of the present invention.

Subsequently, operations of the intercom system 1, particularly, the data transfer method of the illustrative embodiment is described with reference to FIG. 3.

For example, upon the construction, when storing the terminal information of the intercom system 1 in the collective foyer device 10, the management office parent device 20 and the building control unit 40 of each of the dwelling buildings, following operations are performed.

An operator (a construction operator or the like) who carries the external device 80 activates the application displayed on the display unit (operation receiving unit) 82 of the external device 80 (step S1). The activated application establishes communication in the communication establishment unit 83A between the external device 80 and the setting server 90 via the Internet N2, for example, so as to call and transmit the terminal information stored in the setting server 90 (step S2). When the communication is established between the external device 80 and the setting server 90, the external device 80 determines in the update information presence/absence determination unit 83B whether there is the update information of the terminal information in the setting server 90 (step S3). When it is determined that there is no update information in the setting server 90 (No in step S3), the external device 80 displays, on the display unit 82, that there is no update information, in response to a command of the application, and then ends the application (step S4). On the other hand, when it is determined that there is the update information in the setting server 90 (Yes in step S3), the external device 80 displays, on the display unit 82, that there is the update information, in response to a command of the application (step S5). Receiving the display, the operator brings the external device 80 close to the collective foyer device 10C, for example, thereby establishing the NFC communication between the external device 80 and the collective foyer device 10C (step S6). Continuously, the operator uses the external device 80 as a communication medium to transmit the terminal information (the update information) called from the setting server 90 to the collective foyer device 10C, as it is (without preserving the same in the external device 80) (step S7). The transmitted terminal information is stored in the storage unit 105 of the collective foyer device 10C. When the transmission of the terminal information is completed, the external device 80 displays, on the display unit 82, that the transmission of the terminal information is completed, in response to a command of the application, and then ends the application (step S8).

The operator performs the similar operation for each of the other collective foyer devices 10A, 10B, the management office parent device 20 and the building control unit 40, thereby transmitting the terminal information. Alternatively, the operator may transmit the terminal information to the collective foyer device 10C and then transmit the terminal information from the collective foyer device 10C to the other collective foyer device 10A, 10B, the management office parent device 20 and the building control unit 40 via the intercom lines. Also, the operator may transmit the terminal information to the building control unit 40 of the dwelling building A, and then transmit the terminal information from the building control unit 40 of the dwelling building A to the building control units 40 of the other dwelling buildings via the network N1, for example.

In the meantime, in the intercom system 1 of the illustrative embodiment, the operator can manually update or change the terminal information with each collective foyer device 10. When the update operation of the terminal information is performed using the collective foyer device 10, the updated terminal information is transmitted from the collective foyer device 10 to the setting server 90 via the external device 80 and is then stored in the setting server 90. Thereby, it is possible to ensure the consistency of the terminal information stored in the collective foyer device 10 and the terminal information stored in the setting server 90.

According to the intercom system 1, the terminal information called from the setting server 90 is transmitted to the collective foyer device 10, the management office parent device 20, and the building control unit 40 via the Internet N2 without being preserved in the external device 80 by the external device 80 that is used as the communication medium. Therefore, for example, even when the external device 80 used for the transmission operation of the terminal information is lost, since the terminal information is not preserved in the external device 80, it is possible to prevent the leak of the terminal information from the external device 80 and to thus ensure the security.

Also, in the illustrative embodiment, the external device 80, the collective foyer device 10, the management office parent device 20 and the building control unit 40 are respectively provided with the near field wireless communication function. Therefore, since it is possible to transfer the data on the setting server 90 to the intercom system 1 with the simple operation of bringing the external device 80 close to the collective foyer device 10, the management office parent device 20 and the building control unit 40, it is possible to considerably increase the operation efficiency.

Also, the building control units 40 in the dwelling building A to the dwelling building E are interconnected via the network N1. Therefore, since it is possible to transmit the terminal information transmitted to the building control unit 40 of one dwelling building to the building control units 40 of the other dwelling buildings via the network N1 configured to interconnect the dwelling buildings, it is possible to remarkably increase the operation efficiency.

In the meantime, the present invention is not limited to the illustrative embodiment, and can be appropriately modified and improved. In addition, the materials, shapes, dimensions, numerical values, forms, number, arrangement places and the like of the respective constitutional elements of the illustrative embodiment are arbitrary and are not particularly limited inasmuch as the present invention can be implemented.

In the illustrative embodiment, after the external device 80 and the setting server 90 are interconnected and it is determined whether there is the update information in the setting server 90, the external device 80 is brought close to the collective foyer device 10 or the like to establish communication between the external device 80 and the collective foyer device 10, and the update information is transmitted from the setting server 90 to the collective foyer device 10. However, the present invention is not limited thereto. For example, after the application installed in the external device 80 is activated, the external device 80 may be brought close to the collective foyer device 10 or the like to establish communication between the external device 80 and the collective foyer device 10, and then the external device 80 may be connected to the setting server 90 and the update information may be transmitted from the setting server 90 to the collective foyer device 10.

The subject application is based on Japanese Patent Application No. 2016-063066 filed on Mar. 28, 2016, the contents of which are incorporated herein by reference.

The invention claimed is:

1. An intercom system to be used in a housing complex constituted by a plurality of dwelling buildings,
   wherein each of the plurality of dwelling buildings comprises:
      a dwelling parent device installed in each dwelling,
      a terminal device with which it is possible to perform a calling operation for calling the dwelling parent device, the terminal device comprises a storage unit for storing terminal information, and
      a building control unit configured to communicatively interconnect the dwelling parent device in each dwelling of a host building and the terminal device by way of an intercom line,
   wherein the terminal device or the building control unit is capable of performing communication with an external device connected to an external network, and
   wherein when a predetermined application is activated in the external device, the external device is configured to:
      establish communication between the terminal device or the building control unit and the external network,
      determine whether there is updated terminal information of the data on the external network, and
      in response to determining that there is updated terminal information on the external network, transmit the updated terminal information from the external network to the terminal device or the building control unit by using the external device as a communication medium, wherein the updated terminal information is not stored on the external device, and
      automatically switch the external device from communication with the external network to communication with the terminal device or the building control unit for transmitting the updated terminal information to the terminal device or the building control unit.

2. The intercom system according to claim 1, wherein the external device is configured to transfer the data to the terminal device or the building control unit by a near field wireless communication means.

3. The intercom system according to claim 1, wherein the building control units of the plurality of dwelling buildings are interconnected via a network on which communication is to be performed in accordance with a general-purpose protocol.

4. A data transfer method in an intercom system to be used in a housing complex constituted by a plurality of dwelling buildings each of which comprises a dwelling parent device installed in each dwelling, a terminal device comprising a storage unit for storing terminal information and capable of calling the dwelling parent device, and a building control unit configured to communicatively interconnect the dwelling parent device and the terminal device, the data transfer method comprising:
   a step of activating a predetermined application stored in an external device capable of performing communication with the terminal device or the building control unit,
   a step of establishing communication between the external device and an external network by the predetermined application in response to activating the predetermined application,
   a step of determining, by the predetermined application, whether there is updated terminal information of predetermined data on the external network,
   a step of, in response to determining that there is updated terminal information on the external network, establishing communication between the terminal device or the building control unit and the external network via the external device by a near field wireless communication means, a step of transmitting the updated terminal information from the external network to the terminal device or the building control unit by using the external device as a communication medium, and a step of automatically switching the external device from communication with the external network to communication with the terminal device or the building control unit via the near field wireless communication means for transmitting the updated terminal information to the terminal device or the building control unit, wherein the updated terminal information is transmitted from the external network to the terminal device or building control unit without storing the update information on the external device.

5. A data transfer method in an intercom system to be used in a housing complex constituted by a plurality of dwelling buildings each of which comprises a dwelling parent device installed in each dwelling, a terminal device comprising a storage unit for storing terminal information and capable of calling the dwelling parent device, and a building control unit configured to communicatively interconnect the dwelling parent device and the terminal device, the data transfer method comprising:

a step of activating a predetermined application stored in an external device capable of performing communication with the terminal device or the building control unit, a step of establishing communication between the terminal device or the building control unit and the external device by the predetermined application when the predetermined application is activated, a step of establishing communication between the terminal device or the building control unit and the external network via the external device, a step of determining, by the predetermined application, whether there is updated terminal information of predetermined data on an external network, a step of, in response to determining that there is updated terminal information on the external network, transmitting the updated terminal information from the external network to the terminal device or the building control unit by using the external device as a communication medium by means of a near field wireless communication means, and a step of automatically switching the external device from communication with the external network to communication with the terminal device or the building control unit via the near field wireless communication means for transmitting the updated terminal information to the terminal device or the building control unit, wherein the updated terminal information is transmitted from the external network to the terminal device or building control unit without storing the update information on the external device.

6. The intercom system according to claim 4, further comprising, in response to determining that there is updated terminal information on the external network:

a step of transmitting the update information from the external network to the external device via the established communication between the external device and the external network.

7. The intercom system according to claim 5, wherein the step of transmitting the updated terminal information from the external network to the terminal device or the building control unit by using the external device as a communication medium by means of a near field wireless communication mean comprises:

a step of transmitting the update information from the external network to the external device via the established communication between the external device and the external network.

8. The intercom system according to claim 4, wherein the step of, in response to determining that there is updated terminal information on the external network, establishing communication between the terminal device or the building control unit and the external network via the external device, further comprises:

a step of displaying on a display of the external device an indication that there is updated terminal information on the external network, and then establishing the communication between the terminal device or the building control unit and the external network via the external device.

9. The intercom system according to claim 4, wherein the terminal information comprises entrance unlocking codes for each dwelling and the updated terminal information comprises at least one updated entrance unlocking code.

10. The intercom system according to claim 4, wherein the terminal information comprises a calling table that associates a room number of each dwelling, a name of a resident for each dwelling, and a dwelling parent device identifier together.

* * * * *